United States Patent
Toba

(10) Patent No.: US 6,907,276 B2
(45) Date of Patent: Jun. 14, 2005

(54) MOBILE COMMUNICATION TERMINAL WITH EXTERNAL DISPLAY UNIT

(75) Inventor: Hiroyuki Toba, Saitama (JP)

(73) Assignee: NEC Corporation, Tokyo (JP)

(*) Notice: Subject to any disclaimer, the term of this patent is extended or adjusted under 35 U.S.C. 154(b) by 428 days.

(21) Appl. No.: 10/090,792

(22) Filed: Mar. 6, 2002

(65) Prior Publication Data

US 2002/0137551 A1 Sep. 26, 2002

(30) Foreign Application Priority Data

Mar. 21, 2001 (JP) .................................. 2001-079949
Mar. 21, 2001 (JP) .................................. 2001-079950

(51) Int. Cl.⁷ .............................................. H04M 1/00
(52) U.S. Cl. .................... 455/566; 455/575.1; 455/90.3
(58) Field of Search .............................. 455/566, 575.1, 455/575.4, 550.1, 90.3

(56) References Cited

U.S. PATENT DOCUMENTS

| | | | |
|---|---|---|---|
| 5,610,971 A | | 3/1997 | Vandivier |
| 6,002,946 A | * | 12/1999 | Reber et al. ................ 455/557 |
| 6,125,286 A | * | 9/2000 | Jahagirdar et al. ......... 455/566 |
| 6,304,763 B1 | | 10/2001 | Jahagirdar et al. |
| 6,466,202 B1 | | 10/2002 | Suso et al. |
| 6,546,263 B1 | * | 4/2003 | Petty et al. ................ 455/566 |
| 2001/0003707 A1 | | 6/2001 | Moriya ....................... 455/566 |
| 2002/0037754 A1 | | 3/2002 | Hama et al. |
| 2002/0094826 A1 | | 7/2002 | Lee |

FOREIGN PATENT DOCUMENTS

| | | | |
|---|---|---|---|
| CN | 1202079 | | 12/1998 |
| CN | 1253445 A | | 5/2000 |
| GB | 2343324 A | * | 3/2000 |
| JP | 10-65784 | | 3/1998 |
| JP | 10-215303 | | 8/1998 |
| JP | 11-17579 | | 1/1999 |
| JP | 11-68896 | | 3/1999 |
| JP | 2000-22788 | | 1/2000 |
| JP | 2000-23255 | | 1/2000 |
| JP | 2000-69130 | | 3/2000 |
| JP | 2000-89820 | | 3/2000 |
| JP | 2000-101697 | | 4/2000 |
| JP | 3098488 | | 8/2000 |
| JP | 2000-232502 | | 8/2000 |
| JP | 3109089 | | 9/2000 |
| JP | 2000-253113 | | 9/2000 |
| JP | 2001-45117 | | 2/2001 |
| JP | 2001-67049 | | 3/2001 |
| JP | 2002-101160 | | 4/2002 |
| JP | 2002-232531 | | 8/2002 |

* cited by examiner

*Primary Examiner*—Nick Corsaro
*Assistant Examiner*—Shaima Q. Aminzay
(74) *Attorney, Agent, or Firm*—Foley & Lardner LLP

(57) ABSTRACT

A folded type mobile terminal apparatus is comprised of a receiving section, a main display unit, an external display unit, a driver section and a control circuit. The receiving section receives a call or an e-mail from a counter end. The main display unit is provided on an inner surface exposed when the mobile terminal is in an opened state, and the external display unit is provided on an outer surface exposed when the mobile terminal is in a closed state. The driver section drives the main display unit and the external display unit. The control circuit controls the driver section such that data relating to the reception of the call or the e-mail and data of the received call or e-mail are displayed on the main display unit displays in the opened state of the mobile terminal and on the external display unit in the closed state of the mobile terminal.

27 Claims, 8 Drawing Sheets

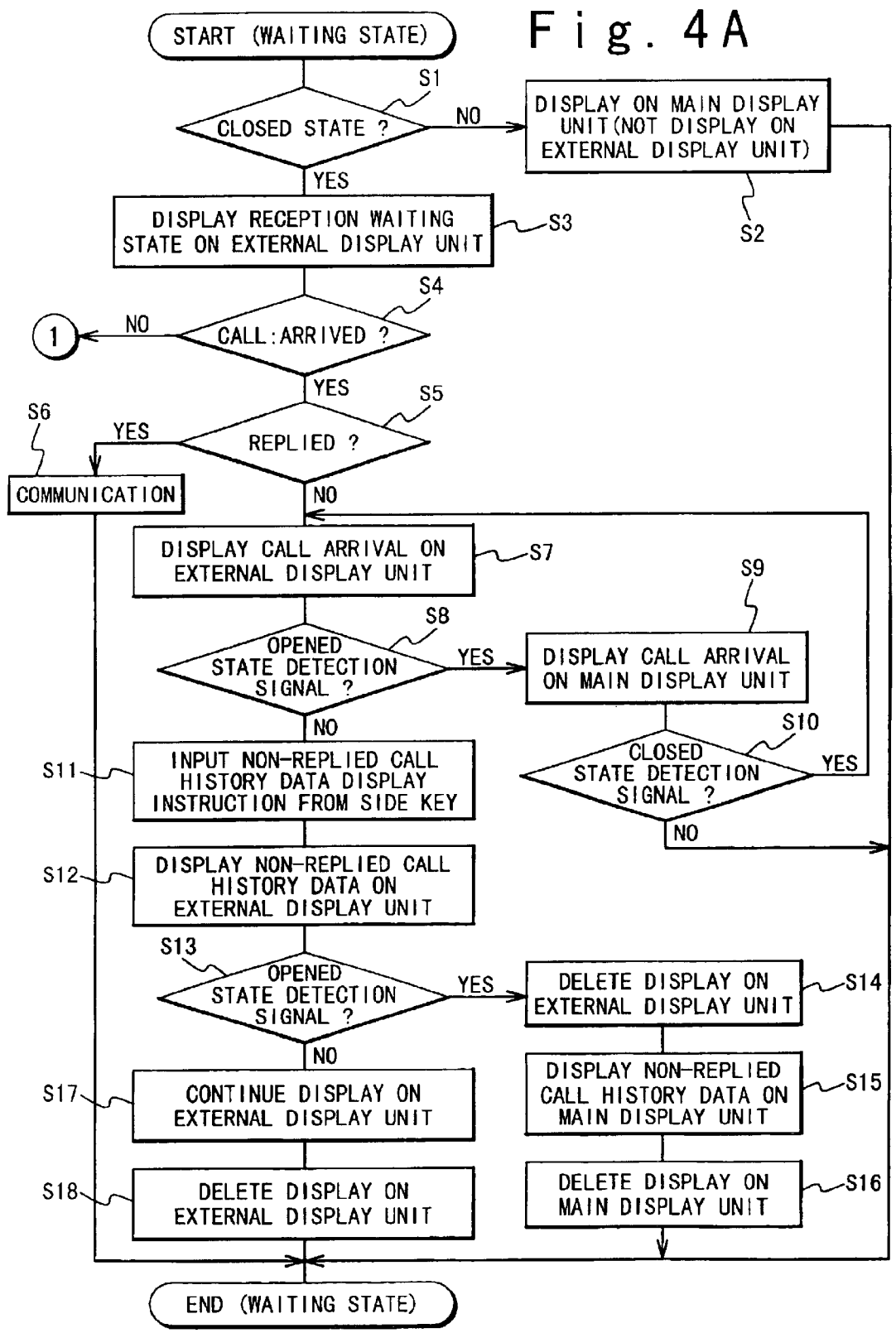

MOBILE COMMUNICATION TERMINAL WITH EXTERNAL DISPLAY UNIT

BACKGROUND OF THE INVENTION

1. Field of the Invention

The present invention relates to a mobile communication terminal which can be folded, and more particularly, to a mobile communication terminal which is comprised of a display section to display data in the folded state.

2. Description of the Related Art

A first conventional example of a folded type mobile phone apparatus is comprised of housings and a connection section, and the mobile phone apparatus can be folded by the connection section. Generally, because a display unit is arranged on the inner surface of one of the housings and is hidden in the folded state, a user cannot confirm data on the display unit in the folded state. For this reason, a second conventional example of the folded type mobile phone apparatus is realized to show data to the user in the folded state. The second conventional example of the mobile phone apparatus has a supplementary display unit (hereinafter, to be referred to as an external display unit) arranged on the outer surface of the mobile phone, in addition to the display unit (hereinafter, to be referred to as a main display unit) arranged on the inner surface of the mobile phone.

However, the display area of the external display unit is small, and the external display unit is used to display simple data to indicate a call arrival or the reception of an e-mail. Therefore, in order to confirm data such as a phone number of a counter end and a reception date and time of the call and to confirm the contents of the e-mail, the user must open the mobile phone apparatus to view the main display unit.

In conjunction with the above description, a mobile phone apparatus with a movable keypad is disclosed in Japanese Laid Open Patent application (JP-A-Heisei 10-65784). In this reference, the mobile phone is comprised of a main unit (22), and a flip part (28) with an inner surface and an outer surface. A keypad (30) is provided on the outer surface of the flip part and has a plurality of push buttons used to operate the mobile phone. A pressure-sensitive display unit (24) is arranged on the main unit (22) to receive an input from the keypad and to reply to it mechanically. The flip part (28) is engaged with the main unit (22) and movably supported to take the first state and the second state. In the first state, the inner surface of the flip part (28) and the pressure-sensitive display (24) face to each other, and in the second state, the flip part (28) extends from the main unit (22) to expose the whole the pressure-sensitive display (24).

Also, a radio communication apparatus is disclosed in Japanese Laid Open Patent application (JP-A-Heisei 10-215303). In this reference, the radio communication apparatus is composed of a main unit with a required function section, and a first housing and a second housing to connect the main unit in the one end by a hinge. A part of the function section and an operation unit to control it are arranged in front surfaces (inner surfaces) of the respective housings that oppose to each other in a folded state. A part of the function section is set in the main unit to carry out some of functions at call arrival in the folded state. Also, a push operation section is provided for the back surface (the outer surface) of either of the first and second housing to execute a function.

Also, a mobile radio apparatus is disclosed in Japanese Laid Open Patent application (JP-A-Heisei 11-68896). In this reference, the mobile radio apparatus is comprised of a housing, and a display section, a receiving section, a transmitting section, and a key function part are provided on the side of the front surface of this housing. Another display section is provided on a surface different from the front surface on which the display section is provided. The housing is comprised of a first housing on which a speech receiving section is provided, and a second housing that is connected to the first housing and has a speech transmitting section.

Also, a folded type mobile phone is disclosed in Japanese Laid Open Patent Application (JP-P2000-69130A). In this reference, whether or not the mobile phone is folded is detected to generate a detection signal, and whether existence or non-existence of an arrived call and/or existence or non-existence of a message by an answering service function are determined based on the detection signal. The folded type mobile phone is comprised of an arrived call display section provided on a position which can be seen in a folded state, an opened or closed state detecting section of the mobile phone, and an arrived call detecting and controlling unit which detects the existence or non-existence of an arrived call. The arrived call display section operates in response to the output from the arrived call detecting and controlling unit.

Also, a folded type mobile phone is disclosed in Japanese Laid Open Patent Application (JP-P2000-101697A). In this reference, the mobile phone is comprised of a first housing, a second housing and a hinge section that combines the first and second housings to be able to be folded. A call arrival display section is provided on a tip portion of the first or second housing.

Also, a folded type mobile phone is disclosed in Japanese Laid Open Patent Application (JP-P2000-232502A). In this reference, the mobile phone is comprised of a first housing with a speaker, a second housing with a microphone and a hinge section which connected with the first and second housings. A first display is provided on the inner surface of the first housing and a second display is provided in an area other than an upper end of the first housing.

Also, a folded-type mobile phone is disclosed in Japan Patent No. 3,098,488. In this reference, the mobile phone is comprised of a main unit, a cover member provided to the main unit to be possible to open and close, and a liquid crystal display section provided inside. A cover member opened or closed state detecting section detects the opened state or the closed state of the cover member. A non-replied call display section is arranged outside the mobile phone, and carries out a display control for a non-reply display, after displaying the call arrival when the detecting section detects the closed state of the cover member and the mobile phone receives an arrived call from a base station. The non-replied call display section displays the call arrival on the liquid crystal display section when the cover member is in the opened state, and lights up or blinks a light emitting diode when the cover member is in the closed state. When the opened state of the cover member is detected while the light-emitting diode is lit up or blinked, a lighting-off section lights off the light emitting diode. After the lighting-off lights off the light emitting diode, the non-replied call display is carried out on the liquid crystal display.

Also, a folded type mobile phone is disclosed in Japan Patent No. 3,109,089. In this reference, the mobile phone is comprised of a first housing, a second housing, a hinge section which combines the first and second housings to be possible to be folded, and a first display section on an inside surface when the mobile phone is folded. The mobile phone is further comprised of a second display section provided on an end portion of one of the first and second housings and a power switch provided on an end portion of the other.

SUMMARY OF THE INVENTION

Therefore, an object of the present invention is to provide a mobile communication terminal, which can display data relating to the reception of a call or e-mail or data of the received call or e-mail on an external display unit or on a main display unit.

Another object of the present invention is to provide a mobile communication terminal, which can display data on an external display unit or a main display unit based on whether the mobile communication terminal is in a closed state or in an opened state.

Still another object of the present invention is to provide a method of displaying data in a mobile communication terminal, in which data relating to the reception of a call or e-mail or data of the received call or e-mail can displayed on an external display unit or on a main display unit.

In an aspect of the present invention, a folded type mobile terminal apparatus is comprised of a receiving section, a main display unit, an external display unit, a driver section and a control circuit. The receiving section receives a call or an e-mail from a counter end. The main display unit is provided on an inner surface exposed when the mobile terminal is in an opened state, and the external display unit is provided on an outer surface exposed when the mobile terminal is in a closed state. The driver section drives the main display unit and the external display unit. The control circuit controls the driver section such that data relating to the reception of the call or the e-mail and data of the received call or e-mail are displayed on the main display unit displays in the opened state of the mobile terminal and on the external display unit in the closed state of the mobile terminal.

The control circuit may automatically control the driver section such that the data relating to the reception of the call or the e-mail is displayed on the main display unit displays in the opened state of the mobile terminal and on the external display unit in the closed state of the mobile terminal, in response to the reception of the call or the e-mail. In this case, the control circuit may control the driver section such that a symbol indicative of the reception of the call is displayed on the main display unit displays in the opened state of the mobile terminal and on the external display unit in the closed state of the mobile terminal in place of the data relating to the reception of the call, when a predetermined time period passes away without a replay to the received call by a user after the display of the data relating to the reception of the call or the e-mail is started. Also, the predetermined time period may be variable and be set by the user.

Also, the folded type mobile terminal may further include a memory. The control circuit stores the data of the received call which is not replied by a user in the memory as non-replied call data. In this case, the folded type mobile terminal may further include an outer key section provided on the outer surface of the mobile terminal in the closed state. The control circuit may read out the non-reply call data from the memory in response to a non-replied call data display instruction inputted from the outer key section, and may control the driver section such that the read-out non-reply call data are displayed on the main display unit in the opened state of the mobile terminal and on the external display unit in the closed state of the mobile terminal. Also, the control circuit may control the driver section such that the read-out non-reply call data are scrolled and displayed on the main display unit in the opened state of the mobile terminal and on the external display unit in the closed state of the mobile terminal, in response to a scroll instruction inputted from the outer key section. Otherwise, the control circuit may control the driver section such that the read-out non-reply call data are displayed one by one on the main display unit in the opened state of the mobile terminal and on the external display unit in the closed state of the mobile terminal, in response to a display switch instruction inputted from the outer key section.

Also, the folded type mobile terminal may further include an outer key section provided on the outer surface of the mobile terminal in the closed state. The control circuit may control the driver section in response to an e-mail display instruction inputted from the outer key section, such that the data of the e-mail is displayed on the main display unit displays in the opened state of the mobile terminal and on the external display unit in the closed state of the mobile terminal.

Also, the data of the received call may include at least one of a phone number of the counter end, a name of the counter end, and a reception date and time of the received call. In this case, the folded type mobile terminal may further include a memory which stores sets of a name and the counter end. The control circuit extracts the name from the memory based on the phone number contained in the received call and drives the driver section such that the extracted name is displayed.

Also, the data of the received e-mail may include at least one of a mail address of a transmitter of the received e-mail, a name of the transmitter, a reception date and time of the received call, a title of the received e-mail, and main sentences of the received e-mail. In this case, the folded type mobile terminal may further include a memory which stores sets of a name and mail address of the transmitter. The control circuit extracts the name from the memory based on the mail address contained in the received e-mail and drives the driver section such that the extracted name is displayed.

Also, the folded type mobile terminal may further include a state detecting unit which detects whether the mobile terminal is in the opened state or in the closed state, and generates an opened state detection signal when the mobile terminal is in the opened state and a closed state detection signal when the mobile terminal is in the closed state. The control circuit drives the driver section such that a display operation is carried out by the main display unit based on the opened state detection signal, and by the external display unit based on the closed state detection signal. In this case, the drive section may include a first driver for the main display unit, and a second driver for the external display unit. The control circuit drives the first driver based on the opened state detection signal and the second driver based on the closed state detection signal. Otherwise, the drive section may include a driver for the main display unit and the external display unit, a first switch provided between the driver and the main display unit to connect the driver to the main display unit in response to the opened state detection signal, and a second switch provided between the driver and the external display unit to connect the driver to the external display unit in response to the closed state detection signal. The control circuit drives the driver the data relating to the reception of the call or e-mail, or the data of the received call or e-mail. In this case, it is desirable that the number of digits displayed on the main display unit is same as the number of digits displayed on the external display unit.

In another aspect of the present invention, a method of using a folded type mobile terminal apparatus, is achieved by (a) receiving a call or an e-mail from a counter end; by (b) detecting whether the mobile terminal is in an opened state or in a closed state to generate an opened state detection signal when the mobile terminal is in the opened state and a closed state detection signal when the mobile terminal is in the closed state; and by (c) carrying out a display control such that data relating to the reception of the call or the e-mail and data of the received call or e-mail are displayed on a main display unit based on the opened state detection signal and on a external display unit based on the closed state detection signal. Here, the main display unit is provided on an inner surface exposed when the mobile terminal is in the opened state, and the external display unit is provided on an outer surface exposed when the mobile terminal is in the closed state.

The (c) carrying out step may be achieved by determining whether the mobile communication terminal is in the closed state or in the opened state, based on the detection result of said (b) detecting step; by driving a first driver for the main display unit when the mobile communication terminal is determined to be in the opened state; and by driving a second driver for the external display unit when the mobile communication terminal is determined to be in the closed state. Otherwise, the (c) carrying out step may be achieved by driving a driver for the main display unit and the external display unit for the display control; by connecting the driver to said main display unit when the mobile communication terminal is in said opened state; and by connecting the driver to the external display unit when the mobile communication terminal is in said closed state.

Also, in the (c) carrying out step, the display control may be carried out such that a symbol indicative of the reception of the call or the e-mail is displayed on the main display unit displays in the opened state of the mobile terminal and on the external display unit in the closed state of the mobile terminal in place of the data relating to the reception of the call, when a predetermined time period passes away without a replay to the received call by a user after the display of the data relating to the reception of the call or the e-mail is started. In this case, the (c) carrying out step may be achieved by storing the data of the received call which is not replied by a user in a memory as non-replied call data; by reading out the non-replied call data from the memory in response to a non-replied call data display instruction inputted from an outer key section provided the outer surface of the mobile terminal in the closed state; and by carrying out the display control such that the read-out non-reply call data are displayed on the main display unit in the opened state of the mobile terminal and on the external display unit in the closed state of the mobile terminal. Also, in the (c) carrying out step, the display control may be carried out such that the read-out non-reply call data are scrolled and displayed on the main display unit in the opened state of the mobile terminal and on the external display unit in the closed state of the mobile terminal, in response to a scroll instruction inputted from the outer key section. Otherwise, in the (c) carrying out step, the display control may be carried out such that the read-out non-reply call data are displayed one by one on the main display unit in the opened state of the mobile terminal and on the external display unit in the closed state of the mobile terminal, in response to a display switch instruction inputted from the outer key section.

Also, in the (c) carrying out step, the display control may be carried out in response to an e-mail display instruction such that the data of the e-mail is displayed on the main display unit in the opened state of the mobile terminal and on the external display unit in the closed state of the mobile terminal.

Also, it is desirable that the data of the received call includes at least one of a phone number of the counter end, a name of the counter end, and a reception date and time of the received call. Also, it is desirable that the data of the received e-mail includes at least one of a mail address of a transmitter of the received e-mail, a name of the transmitter, a reception date and time of the received call, a title of the received e-mail, and main sentences of the received e-mail.

BRIEF DESCRIPTION OF THE DRAWINGS

FIGS. 4A and 4B are a flow chart showing an operation of the mobile communication terminal according to the first embodiment of the present invention;

DESCRIPTION OF THE PREFERRED EMBODIMENTS

Hereinafter, a folded type mobile communication terminal of the present invention will be described with reference to the attached drawings.

Figure 1:
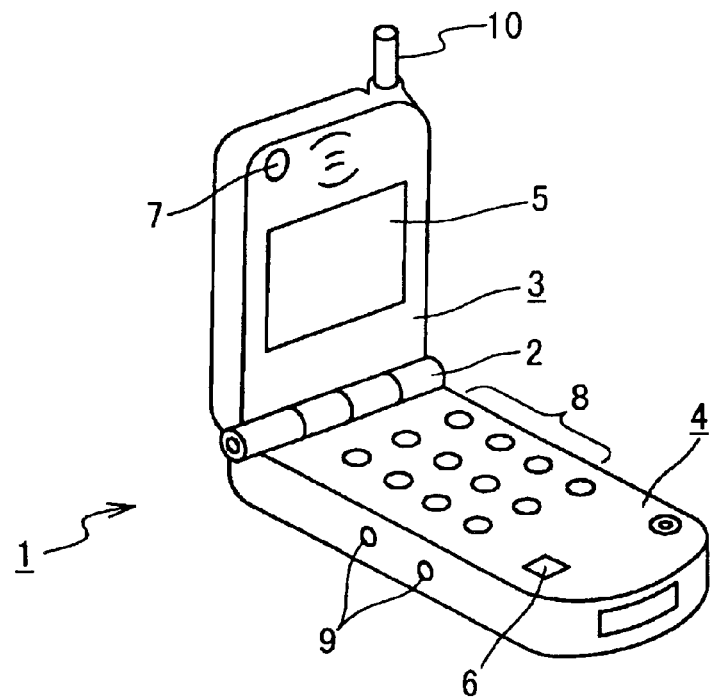
FIG. 1 is a perspective view showing a mobile communication terminal of the present invention in an opened state.

FIG. 1 is a perspective view showing the folded type mobile communication terminal 1 of the present invention in an opened state. Also, FIG. 2 is a perspective view showing the folded type mobile communication terminal 1 of the present invention in a closed state.

Figure 2:
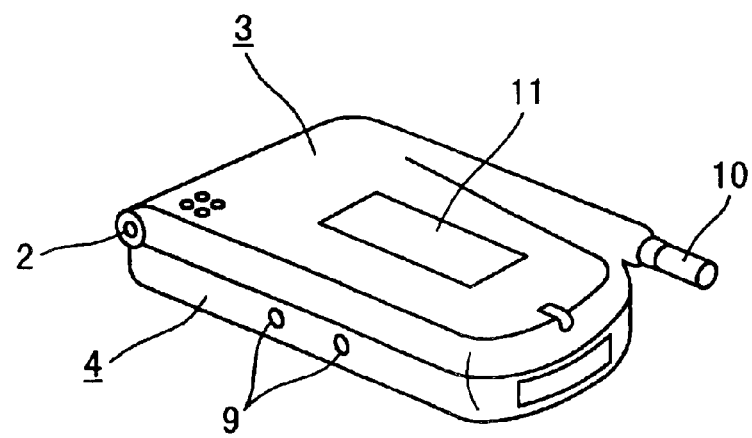
FIG. 2 is a perspective view showing the mobile communication terminal of the present invention in the folded state.

Referring to FIGS. 1 and 2, the mobile communication terminal 1 is comprised of a first housing 3 and a second housing 4 which are connected by a hinge section 2. As shown in FIG. 1, the first housing 3 is comprised of a main display unit 5, a magnet 7, a receiving section and an antenna 10. Also, the first housing 3 is comprised of an external display unit 11. The second housing 4 is comprised of an opened or closed state detecting circuit 6, a main operation section of a plurality of operation keys 8, a supplemental operation section of side keys 9, and a transmitting section.

The main display unit 5 is a liquid crystal display and is provided on the inner surface of the first housing 3. The main display unit 5 is used in the opened state, and is hidden in the closed state. The external display unit 11 is a supplemental liquid crystal display having a display area smaller than the main display unit 5, and is provided on the outer surface of the first housing. The external display unit 11 is used in the closed state. Thus, a user can view only the external display unit 11 in the folded state. The external display unit 11 may be provided on the outer surface of the second housing 4.

The supplemental operation section 9 is used for the user to input instructions for the external display unit 11 in the closed state. However, the supplemental operation section 9 may be used for the user to input instructions for the main display unit 5 in the opened state. Also, in this example, the supplemental operation section 9 is provided for a side of the second housing 4. However, the supplemental operation section 9 may be provided on another area of the outer surface of the first and second housings in the closed state.

The main operation section 8 is comprised of keys to input the numbers of "0" to "9", symbols of "#" and "*", and instructions such as start, end, and re-dial. One function may be allocated to a combination of a plurality of keys.

The opened or closed state detecting circuit 6 detects whether the mobile communication terminal is in the opened state or the closed state, and generates a signal in accordance with the state of mobile communication terminal 1. The opened or closed state detecting circuit 6 is comprised of a Hall element, which carries out a switching operation based on the magnet 7 arranged on a corresponding position of the first housing 3. The opened or closed state detecting circuit 6 generates a closed state detection signal in the closed state and an opened state detection signal in the opened state. The opened or closed state detecting circuit 6 may be comprised of a mechanical switch. In this case, a hub is provided in place of the magnet 7, and the mechanical switch carries out a switching operation using the hub 7 in accordance with the closed state and the opened state.

Figure 3:
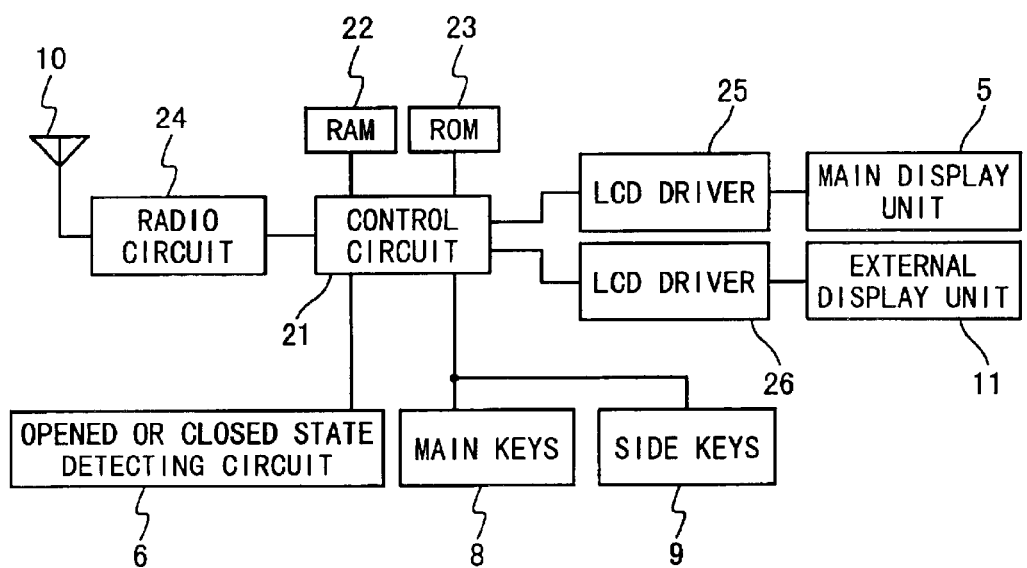
FIG. 3 is a block diagram showing the circuit structure of the mobile communication terminal according to a first embodiment of the present invention.

FIG. 3 is a block diagram showing an example of the circuit structure of the mobile communication terminal according to the first embodiment of the present invention. Referring to FIG. 3, the mobile communication terminal in the first embodiment is comprised of the antenna 10, a radio circuit 24, a RAM 22, a ROM 23, the opened or closed state detecting circuit 6, the main operation section 8, the supplemental operation section 9, a control circuit 21, LCD drivers 25 and 26, the main display unit 5 and the external display unit 11.

The antenna 10 is used to transmit and receive a radio wave to and from a base station. A radio circuit 24 modulates a sound signal or data signal to be transmitted and demodulates received radio wave. Thus, the radio circuit 24 receives a call or an e-mail.

The RAM 22 stores data. The ROM 23 stores font data for various types of display, and a program. The LCD drivers 25 and 26 drive the main display unit 5 and the external display unit 11, respectively.

The control circuit 21 controls the whole mobile communication terminal 1 based on the program stored in the ROM 23. The control circuit 21 controls the LCD driver 25 and LCD driver 26 to display data on the main display unit 5 and the external display unit 11 based on the opened state detection signal and the closed state detection signal, respectively.

The control circuit 21 carries out the display control of data relating to the call arrival and data relating to the reception of the e-mail on the main display unit 5 when the opened or closed state detecting circuit 6 generates the opened state detection signal. Also, the control circuit 21 carries out the display control of data relating to the call arrival and data relating to the reception of the e-mail on the external display unit 11 when the opened or closed state detecting circuit 6 generates the closed state detection signal. For example, when a call is received in the closed state, the control circuit 21 carries out the display control of a symbol or data indicative of the fact of the call arrival on the external display unit 11. Also, when an e-mail is received in the closed state, the control circuit 21 carries out the display control of a symbol or data indicative of completion of the reception of the e-mail, or the reception of the e-mail.

The control circuit 21 stores data of an arrived call in the RAM 22 when the user does not reply to the arrived call. For example, the data of the arrived call includes at least one of the reception date and time of the call arrival, a phone number of a counter end of the arrived call, and a name of the counter end. Hereinafter, the data of the arrived call to which the user does not reply is referred to as non-replied call data.

Also, the control circuit 21 stores data of a received e-mail in the RAM 22 when the e-mail is received. The data of the received e-mail includes at least one of a mail address and name of a transmitter of the received e-mail, a title and main sentences of the received e-mail, and the reception date and time of the e-mail.

A set of the phone number and a name or a set of the e-mail address and a name may be previously stored in the RAM 22. When a call or e-mail is received, the control circuit 21 refers to the RAM 22 based on the phone number or the e-mail address contained in the received call or e-mail, and acquires the name of the counter end.

Also, the control circuit 21 switches the display control from the operation for the external display unit 11 to that for the main display unit 5, if the mobile communication terminal in the closed state is opened. For example, if the opened state detection signal is supplied when the control circuit 21 carries out the display control to display the non-replied call data on the external display unit 11, the control circuit 21 carries out the display control to display the non-replied call data on the main display unit 5.

Figure 4B:
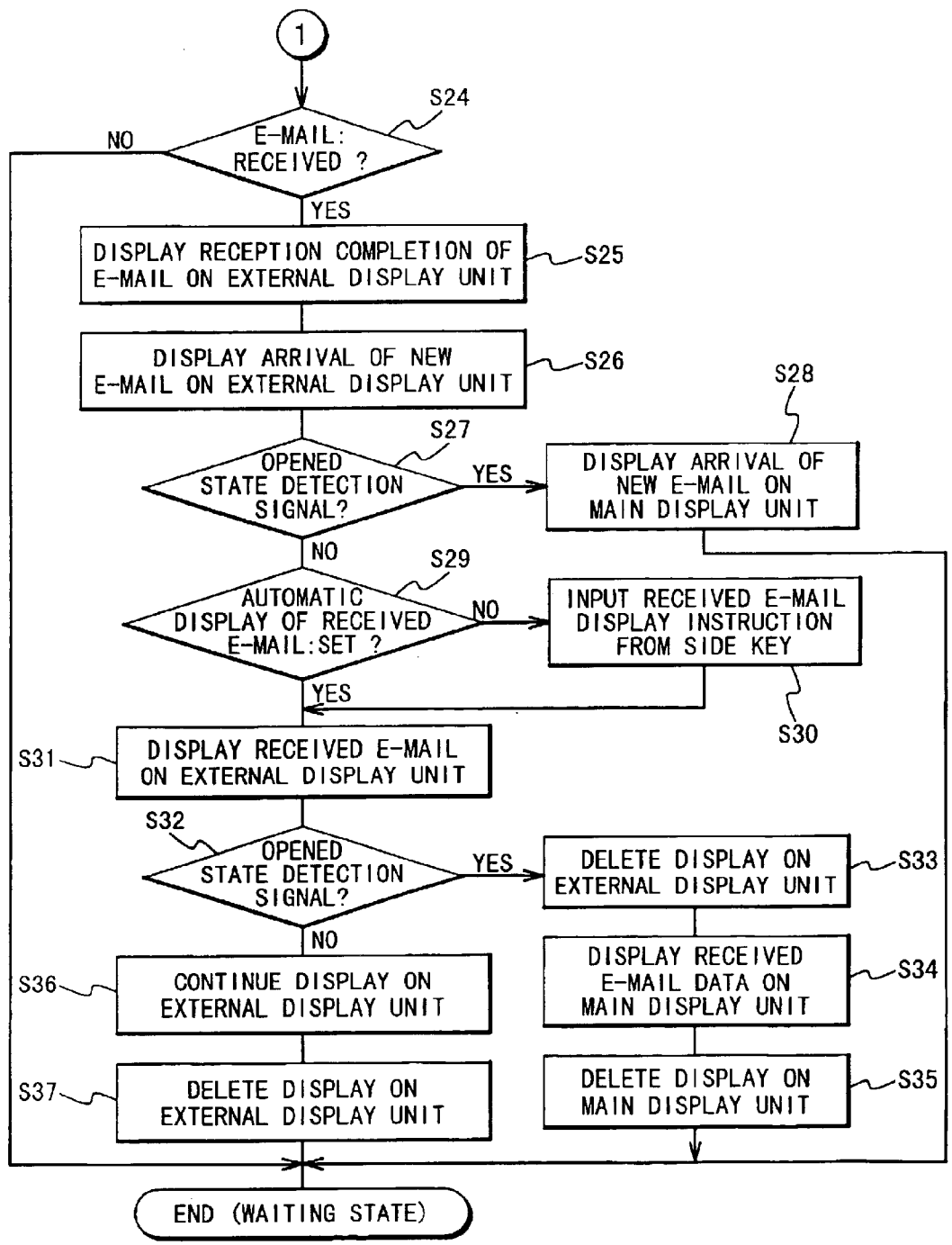

Next, an operation of the mobile communication terminal will be described with reference to FIGS. 4A and 4B.

First, the control circuit 21 determines whether the mobile communication terminal 1 is in an opened state or in the closed state, based on the signal generated by the opened or closed state detecting circuit 6 (Step S1). When determining to be in the opened state, the control circuit 21 does not carry out the display control to display data on the external display unit 11 and carries out the display control to display data on the main display unit 5 (Step S2). For example, if the mobile communication terminal 1 is in a waiting state of an arrived call in the opened state, the control circuit 21 displays an image of the waiting state on the main display unit 5.

On the other hand, if the mobile communication terminal 1 is in the waiting state of an arrived call in the closed state, the control circuit 21 carries out the display control to display the image of the waiting state on the external display unit 11 (Step S3).

Figure 5A:
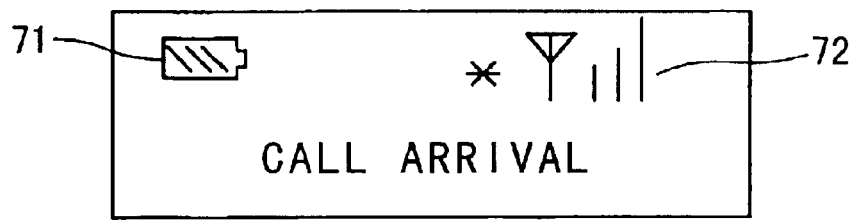
FIGS. 5A to 5C are diagram showing examples of display on an external display unit and a main display unit of the mobile communication terminal in the first embodiment.

In this state, if there is an arrived call in the closed state (step S4), the control circuit 21 informs a user about the arrived call by generating an arrived call sound, and waits for a reply to the arrived call from the user (Step S5). If the user replies to the arrived call, the control circuit 21 starts communication (step S6), and waits the following arrived call after the communication. On the other hand, when the user does not reply to the arrived call, the control circuit 21 carries out the displays control to display the data relating to the call arrival, i.e., the fact of the call arrival on the external display unit 11 (Step S7). FIG. 5A shows an example of the data displayed on the external display unit 11 by the control circuit 21 at the step S7. As shown in FIG. 5A, in addition to the fact of the call arrival, the data 71 of a remaining power quantity of a battery and the reception situation data 72 of the radio wave may be displayed. Also, the control circuit 21 stores the phone number of the counter end contained in the arrived call signal and the date and time of the call arrival in the RAM 22 as the non-replied call data when the user does not reply to the arrived call.

If the opened state detection signal is supplied from the opened or closed state detecting circuit 6 when the data of the call arrival is displayed on the external display unit 11 (Step S8), the control circuit 21 carries out the display control to display the fact of the call arrival on the main display unit 5 (Step S9). After that, if the mobile communication terminal 1 is closed again and the closed state detection signal is supplied to the control circuit 21 (Step S10), the control circuit 21 carries out the display control to display the fact of the call arrival on the external display unit 11 once again (Step S7). In this way, the user can confirm the fact of the call arrival from the display on the external display unit 11 even when the user cannot reply to the arrived call.

Figure 5B:
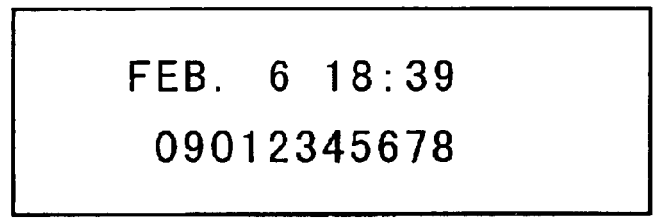

When the user tries to confirm the non-replied call data, the user inputs a display instruction of the non-replied call data from the supplemental operation section 9. When the display instruction of the non-replied call data is supplied through the supplemental operation section 9 (step S11) after the step S7, the control circuit 21 reads out the non-replied call data from the RAM 22 and carries out the displays control to display the non-replied call data on the external display unit 11 in accordance with this instruction (Step S12). FIG. 5B shows an example of the non-replied call data displayed on the external display unit 11 by the control circuit 21 at the step S12. Other data may be displayed as the non-replied call data. For example, the name of the counter end specified from the phone number may be displayed on the external display unit 11.

Figure 5C:
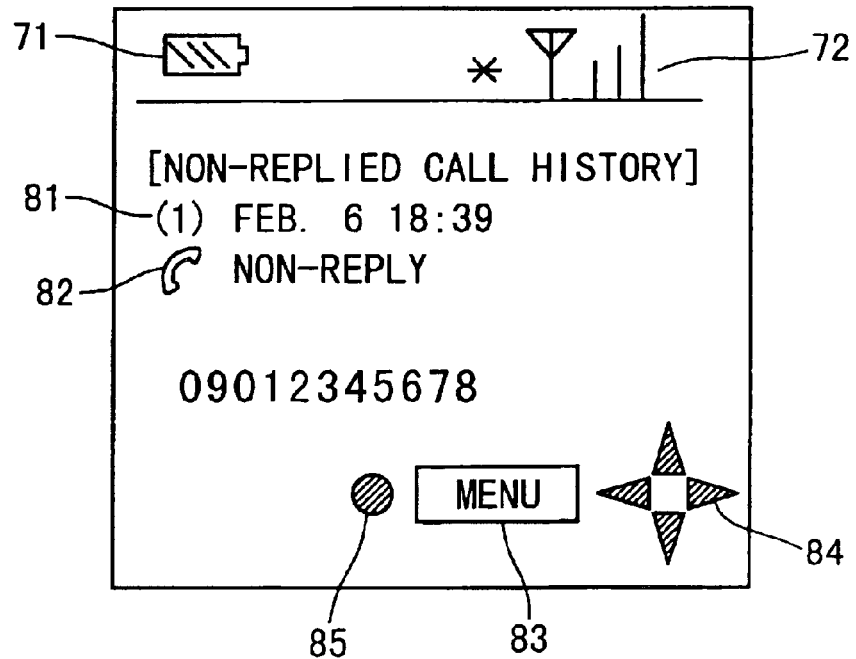

If the opened state detection signal is supplied from the opened or closed state detecting circuit 6 when the non-replied call data is displayed on the external display unit 11 (Step S13), the control circuit 21 carries out the display control to delete the display on the external display Unit 11 (Step 514). Then, the control circuit 21 carries out the display control to display the non-replied call data having displayed on the external display unit 11 on the main display unit 5 (Step 515). The display control is automatically carried out without any operation by the user. FIG. 5C shows an example of the non-replied call data displayed on the main display unit 5 by the control circuit 21 at the step S15. In FIG. 5C, the data 81 indicates that the display relates to the first of the non-replied call data stored in the RAM 22. Also, the data 82 indicates that the user did not reply to the call. In addition to the data 71 of a remaining power quantity of a battery, a reception situation data 72 of radio wave, an icon 83 may be displayed to call other displays. The data 84 is used to indicate the direction of the movement of the cursor, and the data 85 is used to prompt an input.

When an instruction is supplied through the supplemental operation section 9 to delete the display on the non-replied call data, the control circuit 21 carries out the display control to delete the non-replied call data displayed on the external display unit 11 (Step S16). Then, the control circuit 21 carries out the display control to display a reception waiting display on the external display unit 11 again. This instruction may be inputted from the supplemental operation section 9. Also, at the step S15, when the closed state detection signal is supplied, the control circuit 21 may carry out the display control to delete the display of the external display unit 11, and to display a reception waiting display on the external display unit 11 again.

If the opened state detection signal is not supplied after the step S12, the control circuit 21 carries out the display control to continue to display the non-replied call data on the external display unit 11 (S17). Subsequently, when an instruction is supplied from the supplemental operation section 9 to delete the non-replied call data on the external display unit 11, the control circuit carries out the display control to delete the non-replied call data displayed on the external display unit 11 (Step S18). Then, the control circuit 21 carries out the display control to display the reception waiting display on the main display unit 5 again.

Also, the control circuit 21 may carry out the display control to delete the data displayed on the external display unit 11, when there is no opened state detection signal and no input from the supplemental operation section 9 for a predetermined time period after the non-replied call data is displayed at the step S12. The predetermined time period is previously set to the control circuit 21. The setting operation may be carried out in the manufacture of the mobile communication terminal 1 and be carried out by the user. When the user sets, the control circuit 21 may set the time period specified by the user. After deleting the non-replied call data on the external display unit 11 after the predetermined time period, the control circuit 21 may carry out the display control to display the fact of the call arrival on the external display unit 11, in the same way as the step S7.

In the above-mentioned example, the case is shown to display the fact of the call arrival at the steps S7 and S9. However, at the steps S7 and S9, the phone number of the counter end may be displayed in addition to the fact of the call arrival.

Also, when there are a plurality of calls before the instruction is supplied at the step Sll, the control circuit 21 may store a set of the phone number of the counter end and the date and time of the arrived call in the RAM 22 for every call. Then, the control circuit 21 may scroll and display data of the arrived calls one by one as the non-replied call data at the step S9. For example, the control circuit 21 may carry out the display control to display the whole of non-replied call data for the plurality of arrived calls such that the non-replied call data appears, moves and disappear one by one on the external display unit 11 in order irrespective of the operation of the supplemental operation section 9.

Also, the control circuit 21 may carry out the display control to display the non-replied call data in order from the latest data in accordance with the instruction supplied through the supplemental operation section 9. In this case, each of the non-replied call data may be switched and displayed in response to a next display instruction is supplied through the supplemental operation section 9.

When the driver to be driven by the control circuit 21 is switched from the LCD driver 25 to the LCD driver 26, or from the LCD driver 26 to the LCD driver 25, the control circuit 21 converts the display data to match to the LCD driver 26 or 25.

According to such a the mobile communication terminal, the control circuit 21 carries out the display control to display the non-replied call data having been displayed on the external display unit 11 on the main display unit 5, when the mobile communication terminal 1 is opened. Therefore, the user can confirm the non-replied call data on the main display unit even if the user does not operate the supplemental operation section 8 after opening the mobile communication terminal 1. The control circuit 21 carries out the display control to display the data corresponding to the arrived calls having been displayed on the external display unit 11 on the main display unit 5 even if the plurality of calls arrive. Therefore, the user can confirm the non-replied call data displayed on the external display unit 11 or the main display unit 5. Therefore, if the user operates the supplemental operation section 9 to display desired data on the external display unit 11, it is not necessary to carry out the operation to display the desired data on the main display unit 5 once again even if the mobile communication terminal 1 is opened.

If the opened state detection signal is not supplied for a predetermined time period after the display at the step S7 is started, the non-replied call data may be automatically displayed on the external display unit 11. Also, the user may be able to select the setting to display the non-replied call data in accordance with the supplied instruction from the supplemental operation section 9 and the setting in which the control circuit 21 automatically carries out the display control of the non-replied call data.

Next, the case to display data of the e-mail will be described.

Figure 6A:
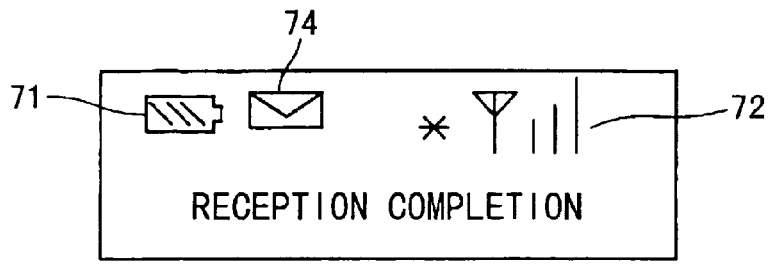
FIGS. 6A to 6D are diagram showing examples of display on the external display unit and the main unit of the mobile communication terminal in the first embodiment.

When answer is No at the step S4, If an e-mail is received in the closed state (step S24), the control circuit 21 carries out the display control to display data relating to the reception of the e-mail, i.e., the data of the reception completion of the e-mail on the external display unit 11 (Step S25). FIG. 6A is an example of the display when the external display unit 11 displays the data of the reception completion of the e-mail. As shown in FIG. 6A, the data 71 of a remaining power quantity of a battery and the data 72 of a reception situation of radio wave may be displayed. The data 74 of an envelope may be displayed to show the reception completion of the e-mail in addition to the data 71 and 72. Also, the control circuit 21 extracts data of the received e-mail such as a mail address and name of a transmitter of the received e-mail, a title and main sentences of the received e-mail, and a reception date and time of the e-mail and stores the data of the received e-mail in the RAM 22.

Figure 6B:
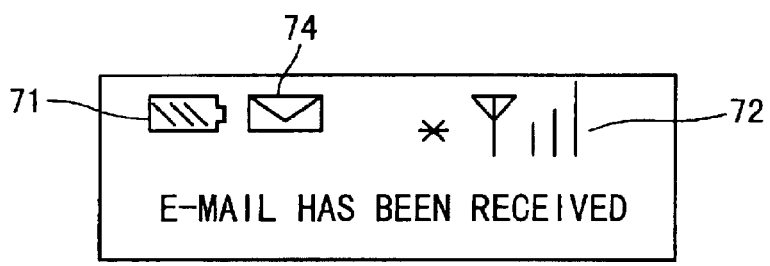

Subsequently to a step S25, the control circuit 21 carries out the display control to display the data relating to the reception of the e-mail, i.e., data of the fact of the arrival of a new e-mail on the external display unit 11 for a predetermined time period (for example, two seconds), as shown in FIG. 6B (Step S26). At this time, if the opened state detection signal is supplied from the opened or closed state detecting circuit 6 when the data relating to the reception of the e-mail is displayed on the external display unit 11 (Step S27), the control circuit 21 carries out the display control to display the data of the reception of a new e-mail on the main display unit 5 (Step S28). After that, when the mobile communication terminal 1 is again closed and the closed state detection signal is supplied, the data of the reception of the new e-mail may be displayed on the external display unit 11 once again.

Also, whether or not the data of the e-mail should be automatically displayed on the external display unit 11 when the opened state detection signal is not supplied after the step S26 is set to the control circuit 21. This setting may be previously carried out by the user.

If the setting to automatically display the data of the e-mail is not accomplished (Step S29), when a display instruction of the data of the e-mail is supplied through the supplemental operation section 9 (Step S30), the control circuit 21 carries out the display control to display the data of the e-mail on the external display unit 11 in accordance with this instruction (Step S31). On the other hand, if the setting to automatically display data of the e-mail is accomplished, the control circuit 21 carries out the display control to automatically display the data of the e-mail on the external display unit 11 when the opened state detection signal is not supplied after the step S26 (Step S31). For example, the opened state detection signal is not supplied for a predetermined time period (e.g., 2 seconds) after starting the display of the step S26, the control circuit 21 carries out the display control to automatically display the data of the e-mail on the external display unit 11.

It should be noted that the control circuit 21 may not have a function to set whether or not the data of the e-mail should be automatically displayed on the external display unit 11. In this case, the control circuit 21 carries out one of the display operation of the step S31 in accordance with an instruction supplied through the supplemental operation section 9 and the automatic display operation of the step S31.

Figure 6C:
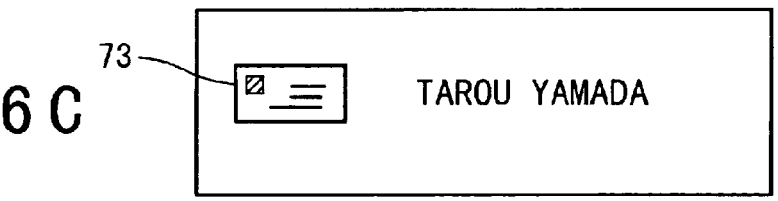

FIG. 6C is an example of the display when the external display unit 11 displays the data of the e-mail at the step S31. In the example shown in FIG. 6C, the name of the transmitter of the e-mail is displayed with the data 73 of the envelope. The control circuit 21 extracts the name of the transmitter specified from the mail address from the RAM 22 and carries out the display control to display it on the external display unit 11. The data of the e-mail includes at least one of the mail address and name of the transmitter, the reception date and time, in addition to the title and main sentences of the received e-mail.

At the step S31, the control circuit 21 may carry out the display control to display at least one of the items such as the title, the main sentences, the mail address, the name, the reception date and time. The items to be displayed at the step S31 are previously set to the control circuit 21. This setting may be carried out in manufacture and be carried out by the user. When the user sets, the control circuit 21 sets the items specified by the user from among the above items.

The control circuit 21 carries out the display control to display the whole data such that the data of each item is displayed to appear on the external display unit 11 in order, to move and to disappear from it, without relation to the operation of the supplemental operation section 9, when each item cannot be displayed at once on the external display unit 11. The control circuit 21 may carry out the display control to move only a part of the items. For example, the title continues to be displayed at the same position and the main sentences are displayed to appear in order, to move and to disappear. Also, the control circuit 21 may carry out the display control to display the data of each item while scrolling the data in accordance with the instruction supplied from the supplemental operation section 9. The control circuit 21 may carry out the display control to switch and display the data of the items in the order in accordance with the supplied instruction from the supplemental operation section 9.

Figure 6D:
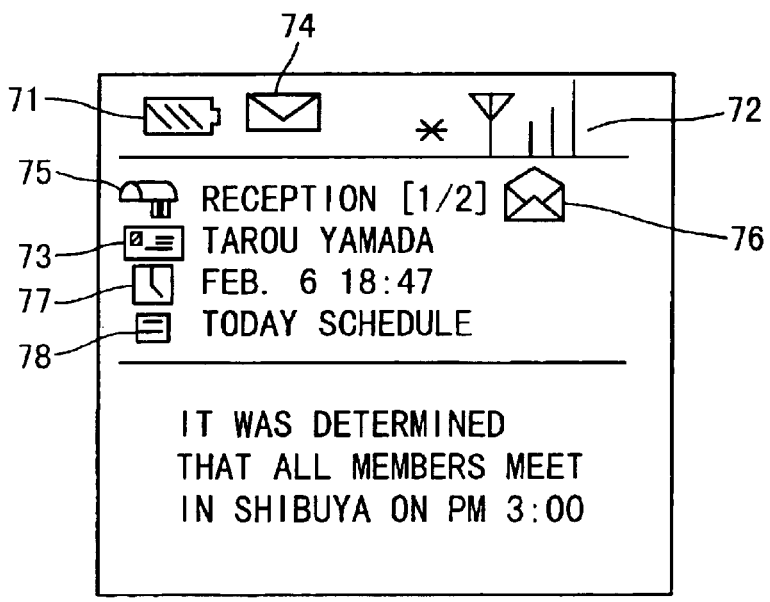
Figure 7:
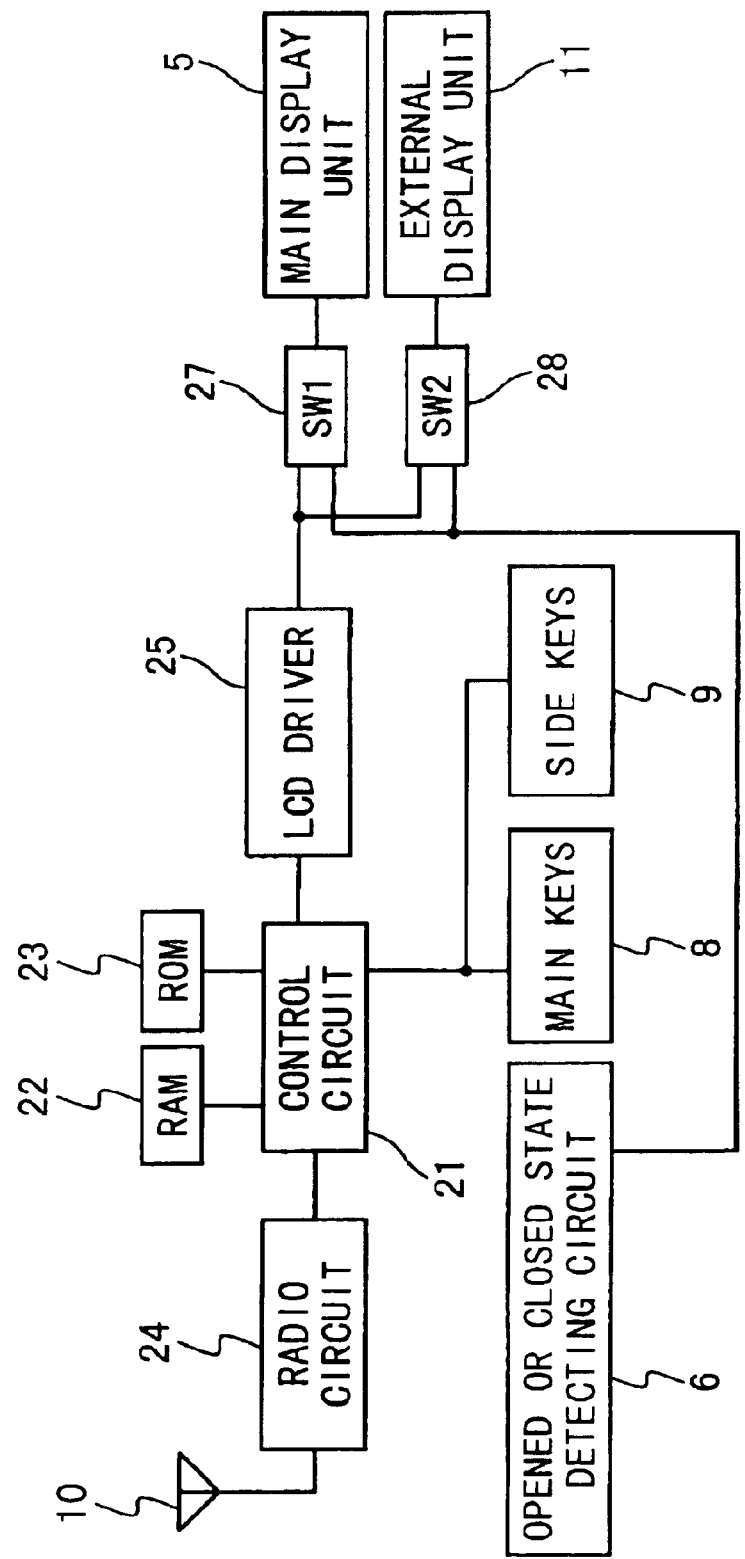
FIG. 7 is a block diagram showing the circuit structure of the mobile communication terminal according to a second embodiment of the present invention.

If the opened state detection signal is supplied from the opened or closed state detecting circuit 6 while the data of the e-mail is displayed on the external display unit 11 (Step S32), the control circuit 21 carries out the display control to delete the display on the external display unit 11 (Step S33). Then, the control circuit 21 carries out the display control of the more detailed data of the e-mail on the main display unit 5 (Step S34). If the opened state detection signal is supplied, the control circuit 21 carries out the display control to automatically display the data of the e-mail on the main display unit 5 without the operation by the user. FIG. 6D shows an example of the data displayed on the main display unit 5 by the control circuit 21 at the step S31. When a plurality of e-mails are received, the control circuit 21 stores each of the items in the RAM 22 for every received e-mail, to be mentioned later. In an example shown in FIG. 6D, the display "the reception [½]" with the data 75 of a mailbox shows the first mail of two e-mails. Also, in this example, in addition to the name of the transmitter, the reception date and time are displayed with the data 77 of a watch, and a title is displayed with the data 78 of a letterform. Also, the data displayed in the lower portion is the main sentences of the e-mail. Besides, the data of a remaining power quantity 71 of a battery, the reception situation data 72 of radio wave, the data 74 of an envelope, the data 76 of an envelope indicating that the e-mail is already read may be displayed.

When an instruction is supplied from the main operation section 8 to delete the data on the main display unit 5, the control circuit 21 carries out the display control to delete the data of the e-mail displayed on the main display unit 5 (step S35), and then waits for the following arrived call. This instruction may be supplied from the supplemental operation section 9. Also, when the closed state detection signal is supplied at the step S34, the control circuit 21 may carry out the display control to delete the data on the main display unit 5 and wait for the following arrived call.

Also, if the opened state detection signal is not supplied after the step S31, the control circuit 21 continues to control to display the data of the e-mail on the external display unit 11 (Step S36). Subsequently, when an instruction is supplied from the supplemental operation section 9 to delete the data of the e-mail on the external display unit 11, the control circuit 21 carries out the display control to delete the data of the e-mail displayed on the external display unit 11 (Step S37), and then, to display the reception waiting display on the external display unit 11 again.

Also, when the opened state detection signal is not supplied for a predetermined time period and there is no input from the supplemental operation section 9, after the data of the e-mail is displayed on the external display unit 11 at the step S31, the control circuit 21 may carry out the display control to delete the data displayed on the external display unit 11. The predetermined time period is previously set to the control circuit 21. This setting may be carried out in manufacture and be carried out by the user. When the user sets, the control circuit 21 may set the time which the user specifies. After deleting the data on the external display unit 11 after the predetermined time period passes, the control circuit 21 carries out the display control to display the data relating to the e-mail indicative of the reception of a new e-mail on the external display unit 11, like the step S26.

In the above-mentioned example, the case is shown where the data of the e-mail is displayed after the display of step S26 exemplified in FIG. 6B. However, the operations of the step S27 and the subsequent may be carried out without carrying out the operation of the step S26.

It should be noted that when a plurality of e-mails are received, the control circuit 21 stores each of the items of the received e-mail n the RAM 22 for every received e-mail. Then, the control circuit 21 may carry out the display control to display the data of the latest e-mail on the external display unit 11 at the step S31.

Or, the control circuit 21 may carry out the display control to display the data of the plurality of received e-mails in order. For example, the control circuit 21 may carry out the display control to display the whole data of the plurality of e-mails such that the data appear on the external display unit 11 in order, to move and to disappear from it, without the operation of the supplemental operation section 9. When each of the items of each of the received e-mails is displayed, the control circuit 21 may carry out the display control to scroll the data of the plurality of e-mails in accordance with an instruction supplied from the supplemental operation section 9.

Also, the control circuit 21 may carry out the display control to switch or change the e-mails one by one in order from the latest e-mail in accordance with the instruction supplied from the supplemental operation section 9. That is, the control circuit 21 carries out the display control to display the data such as the title and main sentences of the data of the latest e-mail in accordance with an instruction from the user. If a display instruction for the following e-mail is supplied through the supplemental operation section 9, the control circuit 21 carries out the display control to display the following e-mail.

If the opened state detection signal is supplied when the data of the plurality of e-mails are displayed at the step S31, the control circuit 21 carries out the display control to display on the main display unit 5, the detailed data of the e-mail corresponding to the items are displayed on the external display unit 11 at the time when the opened state detection signal is supplied. That is, if each of the plurality of e-mails such as the name of the transmitter, the title, the main sentences, and the reception date and time is displayed on the external display unit 11. At this time, if the opened state detection signal is supplied when one of the plurality of e-mails is displayed, the control circuit 21 carries out the display control to display the data of the e-mail on the main display unit 5.

According to such a mobile communication terminal, the control circuit 21 carries out the display control to display on the main display unit 5, the detailed data of the e-mail corresponding to the item displayed on the external display unit 11 at the time when the mobile communication terminal 1 is opened. Therefore, the user can confirm the data of the e-mail on the main display unit even if the user does not operate the key 8 after opening the mobile communication terminal 1. Even if a plurality of e-mails are received, the control circuit 21 carries out the display control to display on the main display unit 5, the detailed data of the e-mail corresponding to the item having been displayed on the external display unit 11. Therefore, the user can confirm the detailed data on the main display unit 5 immediately. Therefore, if the user operates the supplemental operation section 9 to display the desired data on the external display unit 11, it is not necessary to carry out the operation to display the desired data on the main display unit 5 once again after the mobile communication terminal 1 is opened.

It should be noted that when the data is displayed to appear on the external display unit 11 in order, to move and to disappear from it, the direction of the movement of the data may be any of the left, right, up and down directions. Also, the direction may be an oblique direction. When each data is displayed while moving, the control circuit 21 may display the data to move at a constant speed. The control unit 21 may carry out the display control to stop the movement once when the data for one mail or one item reaches the center of the external display unit 11 and to start the movement again. Moreover, the control unit 21 may carry out the display control to move characters while blinking until the data for one mail or one item moves to the center of the external display unit 11, to stop the blink and the movement at the center once, and to move again while blinking.

In the above-mentioned example, a case is shown in which the supplemental operation section 9 is arranged as on the side of the mobile communication terminal 1 to input an instruction about the display on the external display unit 11. However, the supplemental operation section 9 may be provided on the outer back surface of the first housing 3 or second housing 4 of the mobile communication terminal 1. In this case, the operations at the steps S11, S18, S14, S30, and S37 may be carry out to scroll the display data on the external display unit 11 in accordance with an instruction supplied from the key provided for the back.

Next, the mobile communication terminal according to the second embodiment of the present invention will be described.

The perspective views of the mobile communication terminal in the second embodiment in the opened state and the closed state are same as those shown in FIGS. 1 and 2.

The circuit structure of the mobile communication terminal in the second embodiment is basically the same as that in the first embodiment. Therefore, the different points will be described. In the first embodiment, the two LCD drivers 25 and 26 are used. However, in the second embodiment, only the LCD driver 25 is used. The main display unit 5 and the external display unit 11 are common to the first and second embodiments. The main display unit 5 is connected with the LCD driver 25 via a switch 27 and the external display unit 11 is connected with the LCD driver 25 via a switch 28. The opened or closed state detecting circuit 6 supplies the opened state detection signal and the closed state detection signal to the control circuit 21 in the first embodiment. However, in the second embodiment, the opened or closed state detecting circuit 6 supplies the opened state detection signal to the switch 27 and the closed state detection signal to the switch 28. The switch 27 connects column drive lines and row drive lines from the LCD driver 25 to the main display unit 5 in response to the opened state detection signal. The switch 28 connects the column drive lines and a part of the row driving lines from the LCD driver 25 to the external display unit 11 in response to the closed state detection signal. In this way, data can be automatically displayed on the main display unit 5 or the external display unit 5 based on whether the mobile communication terminal is in the opened state or in the closed state. The control circuit 21 is not necessary to carry out the complicated display control separately for the main display unit 5 and the external display unit 11. It is convenient that the external display unit 11 displays data with the same number of digits as data displayed on the main display unit 5. It is desirable that the external display unit 11 has the same width as the main display unit 5, if the size of the display character is same.

In the above, the column drive lines may be not connected via the switches, but connected directly to the main display unit 5 and the external display unit 11. Also, the opened state detection signal and the closed state detection signal may be supplied to the main display unit 5 and the external display unit 11, respectively. In this case, these detection signals may be used to turn on or off backlight (not shown) of each of the main display unit 5 and the external display unit 11. In addition, these detection signals may be used to turn on or off the main display unit 5 and the external display unit 11.

Figure 8:
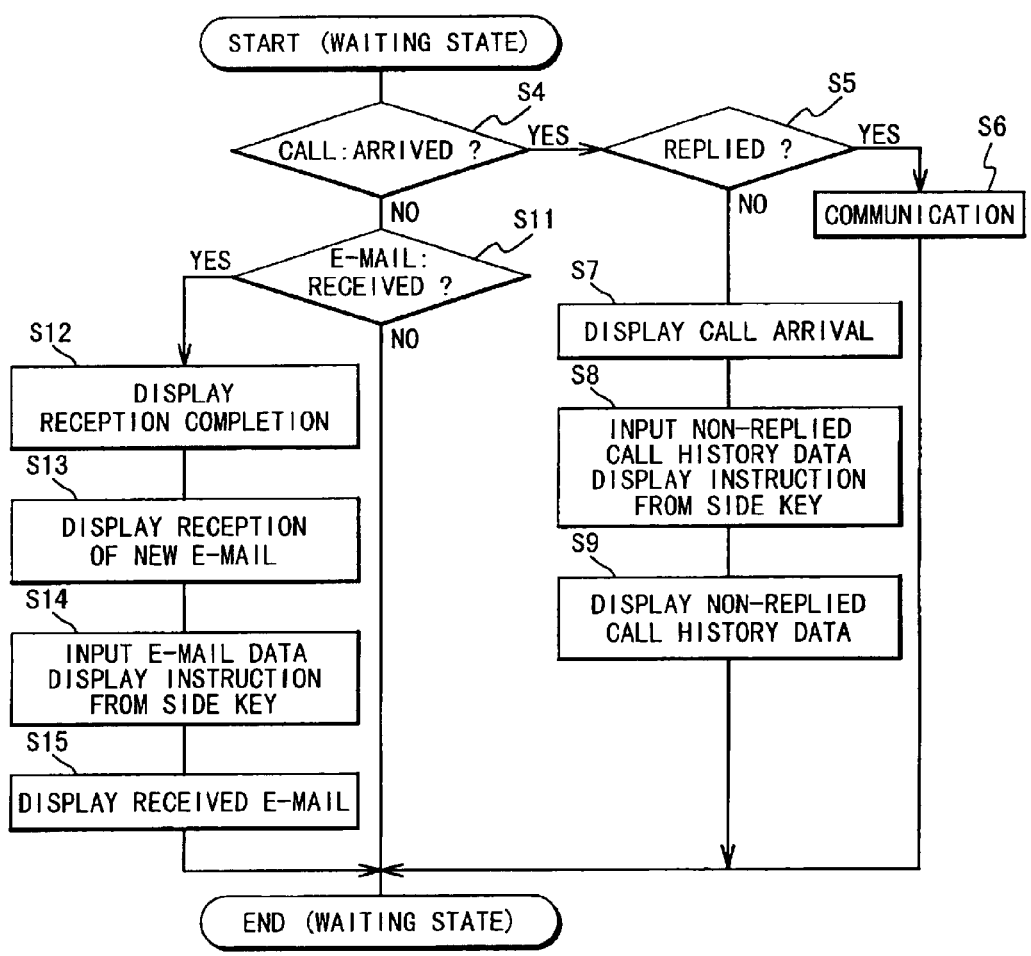
FIG. 8 is a flow chart showing an operation of the mobile communication terminal according to the second embodiment of the present invention.

Next, the operation of the mobile communication terminal in the second embodiment will be described. FIG. 8 is a flow chart showing the operation of the mobile communication terminal in the second embodiment.

Referring to FIG. 8, if there is an arrived call from a counter end (step S4), the control circuit 21 informs a user about the arrived call by being generating an arrived call sound, and waits for a reply to the arrived call from the user (Step S5). If the user replies to the arrived call, the control circuit 21 starts communication (step S6), and waits the following arrived call after the communication. On the other hand, when the user does not reply to the arrived call, the control circuit 21 controls the LCD driver 25 and the call arrival is displayed on the external display 11 in the closed state (Step S7), as shown in FIG. 5A. Also, the control circuit 21 stores the phone number of the counter end contained in the arrived call and date and time of the call arrival in the RAM 22 as the non-replied call data when the user does not reply to the arrived call. Thus, the user can confirm the fact of the call arrival from the display of the external display 11 even when the user cannot reply to the arrived call.

When the user tries to confirm non-replied call data, the user supplies a display instruction of the non-replied call data from a side key of the supplemental operation section 9. When the display instruction of the non-replied call data is supplied (step S8) through the supplemental operation section 9, the control circuit 21 drives the LCD driver 25 in accordance with this instruction and the non-replied call data is displayed on the external display 11 in the closed state (step S9), as shown in FIG. 5B.

When an instruction is supplied through the supplemental operation section 9 to delete the display of the non-replied call data, the control circuit 21 deletes the non-replied call data displayed on the external display 11. Then, the control circuit 21 controls the LCD driver 25 to display a reception waiting display on the external display 11 again. At the step S9, when the opened state detection signal is supplied from the opened or closed state detecting circuit 6, the display of the external display 11 is deleted and the non-replied call data is displayed on the main display unit 5.

Also, the control circuit 21 may delete the data displayed on the external display 11, when there is no input for a predetermined time period from the supplemental operation section 9 after the non-replied call data is displayed at the step S9. The predetermined time period is previously set to the control circuit 21. The setting operation may be carried out in manufacture of the mobile phone 1 and be carried out by the user. When the user sets, the control circuit 21 may set the time period specified by the user.

In the above-mentioned example, the case is shown to display the fact of the call arrival at the step S7. However, at the step S7, the phone number of the counter end may be displayed in addition to the fact of the call arrival.

Also, in the above-mentioned example, the case is shown where the control circuit 21 stores the non-replied call data for one call in the RAM 22 when there is one arrived call. When there are a plurality of calls before the instruction is supplied at the step S8, the control circuit 21 may store the phone number of the counter end and the date and time of the arrived call in the RAM 22 for every call. Then, the control circuit 21 may drive the LCD driver 25 at the step S9 such that the data of the arrived calls is displayed one by one as the non-replied call data. For example, the control circuit 21 may control the LCD driver 25 to display the whole data of the arrived calls for the plurality of arrived calls, by displaying the data of the arrived calls to such that the data appears, moves and disappear one by one on the external display 11 in order irrespective of the operation of the supplemental operation section 9.

Also, the control circuit 21 may scroll a plurality of data of the arrived calls in accordance with an instruction supplied from the supplemental operation section 9.

The control circuit 21 may display the data of the arrived call such as the phone number of the counter end and the date and time of the call arrival in order from the latest arrived call in accordance with an instruction supplied through the supplemental operation section 9. In this case, the control circuit 21 may control the driver 25 to display the data of the arrived calls one by one each time when a next display instruction is supplied through the supplemental operation section 9. At this time, the data of each of the arrived call may be displayed to appear on the external display 11, to move and to disappear from it in order. Also, the data of each of the arrived call may be scrolled or switched in accordance with the instruction supplied from the supplemental operation section 9.

Next, the case to display data of the e-mail will be described.

If an e-mail is received in the closed state (step S11), the control circuit 21 controls the LCD driver 25 such that the data of the reception completion of the e-mail is displayed on the external display 11 (Step S12), as shown in FIG. 6A. Also, the control circuit 21 extracts and stores the mail address of a transmitter of the received e-mail, a title and main sentences of the received e-mail, and a reception date and time of the e-mail in the RAM 22.

Subsequently to the step S12, the control circuit 21 controls the driver 25 such that data of the arrival of a new e-mail is displayed on the external display 11 (Step S13), as shown in FIG. 6B. The control circuit 21 continues the display of FIG. 6A for a predetermined time period (for example, two seconds), and then the arrival of the new e-mail shown in FIG. 6B is displayed. Thus, the user can confirm that the e-mail has been received, by viewing the data displayed on the external display 11 at the step S12 or step S13. When the user tries to confirm the data of the e-mail, the user inputs a display instruction of the data of the e-mail from a side key of the supplemental operation section 9. When the display instruction of the data of the e-mail is inputted through the supplemental operation section 9 (step S14), the control circuit 21 controls the driver 25 such that the data of the received e-mail is displayed on the external display 11 in accordance with this instruction (Step S15), as shown in FIG. 6C in the closed state and as shown in FIG. 6D in the opened state. At this time, the control circuit 21 carries out the display control of the data to appear on the external display 11 in order, to move and to disappear from it, regardless of the operation of the supplemental operation section 9, for display of the whole main sentences. Also, in accordance with an instruction supplied from the supplemental operation section 9, the whole main sentences of the e-mail may be scrolled and displayed.

The data of the e-mail includes the mail address, name of the transmitter, the reception date and time and so on in addition to the title and main sentences. The control circuit 21 may carry out the display control of only each item of the title, main sentences, the mail address and name of the transmitter, the reception date and time and so on at the step S15 and a combination of these items. If the name of the counter end corresponding to each mail address is stored previously in the RAM 22, the name specified from the mail address may be retrieved from the RAM 22 and displayed on the external display 11. The items to be displayed at the step S15 are previously set to the control circuit 21. This setting may be carried out in the manufacture and be carried out by the user. When the user sets, the control circuit 21 sets the items specified by the user from among the title, main sentences, the mail address and name of the transmitter, the reception date and time and so on. For example, when the items to be displayed are previously supplied by the user, the control circuit 21 carries out the display control of the items at the step S15.

The control circuit 21 carries out the display control of the whole data to be displayed such that the data of each item is displayed to appear on the external display 11 in order, to move and to disappear from it, without relation to the operation of the supplemental operation section 9, when each item of the title, the main sentences, the mail address, the name of the transmitter, the reception date and time and so on cannot be displayed at once.

The control circuit 21 may display for only a part of items to move. For example, the title continues to be displayed on a same position and the main sentences may be displayed to appear in order, to move and to disappear.

The control circuit 21 may scroll and display data with each item in accordance with an instruction supplied from the supplemental operation section 9. The control circuit 21 may switch and display each item in the order in accordance with an instruction supplied from the supplemental operation section 9.

When an instruction is supplied from the supplemental operation section 9 to delete the display of the data of the e-mail, the control circuit 21 deletes the data displayed on the external display 11. Then, the control circuit 21 controls the external display 11 to display the reception waiting display again. When an opened state detection signal is supplied from the opened or closed state detecting circuit 6 in the state of step S15, the display of the external display 11 may be deleted. That is, the data of the e-mail having been displayed on the external display 11 may be deleted when the mobile communication terminal 1 is opened. Also, the control circuit 21 may delete the data displayed on the external display 11, when there is no input from the supplemental operation section 9 for a predetermined time period after displaying the data of the e-mail at the step S15. The predetermined time period is previously set in the control circuit 21. This setting may be carried out in manufacture and be carried out by the user. When the user sets it, the control circuit 21 may set the time specified by the user. After the data on the external display 11 is deleted after the predetermined time period passes, the control circuit 21 may carry out the display controls of the arrival of the new e-mail on the external display 11 like the step S13.

In the above-mentioned example, the case is shown in which the data of the e-mail is displayed after the display of FIG. 6B. However, the step S14 and the subsequent steps may be carried out without carrying out the step S13.

Also, in the above-mentioned example, a case is shown in which the control circuit 21 receives one e-mail and stores data of the e-mail in the RAM 22. When a plurality of e-mails are received before a display instruction of the data of the e-mail at the step S14 is supplied, the control circuit 21 stores each of items such as the title in the RAM 22 every received e-mail. Then, the control circuit 21 may display the data of the plurality of e-mails on the external display 11 at the step S15. For example, the control circuit 21 may display the whole data of the plurality of e-mails such that the data are displayed to appear on the external display 11 in order, to move and to disappear from it, without relation to the operation of the supplemental operation section 9. When the respective items such as the title and main sentences about the plurality of e-mail are displayed, the control circuit 21 may scroll and display the data of the plurality of e-mails in accordance with an instruction supplied from the supplemental operation section 9.

Also, the control circuit 21 may display the data of each of the received e-mails by switching the display in order from the latest e-mail in accordance with an instruction supplied from the supplemental operation section 9. That is, the control circuit 21 carries out the display control of the title and main sentences of the data of the latest e-mail and so on in accordance with an instruction from the user, and may display the e-mail previous by one to carry out the similar display, if a display instruction of the following e-mail is supplied through the supplemental operation section 9.

In the above-mentioned example, the control circuit 21 carries out the display control of data of the e-mail on the external display 11 after the step S13, when an instruction is supplied from the supplemental operation section 9. The control circuit 21 may automatically display the data of the e-mail on the external display 11 after the step S13, even if there is no instruction from the supplemental operation section 9. For example, after the display of the step S13 is carried out for a predetermined time period (e.g., for 2 seconds), the data of the e-mail may be automatically displayed, as shown in FIG. 6C or 6D.

Also, in response to the supplied instruction from the supplemental operation section 9, the user may be able to select the setting to display the data of the e-mail and the setting where the control circuit 21 automatically carries out the display control of the data of the e-mail.

In the same way, the control circuit 21 may automatically display the non-replied call data after step S7 even when an instruction is not supplied from the supplemental operation section 9. Also, the user may be able to select the setting to display the non-replied call data and the setting where the control circuit 21 carries out the display control of the non-replied call data automatically, in accordance with an instruction supplied from the supplemental operation section 9.

According to such a mobile communication terminal, the control circuit 21 carries out the display control of data of the arrived call on the external display 11. Therefore, the user can confirm the phone number of the counter end, the date and time of the call arrival and so on, even if the user does not make the mobile communication terminal 1 the opened state. In the same way, the control circuit 21 carries out the display control of the data of the received e-mail on the external display 11. Therefore, the user can confirm the mail address of the transmitter and so on even if the user does not make the mobile communication terminal 1 the opened state.

Also the control circuit 21 can display the whole data by scrolling the data to appear on the external display 11 in order, to move and to disappear from it, in accordance with an instruction supplied from the supplemental operation section 9.

It should be noted that when the data is displayed to appear on the external display 11 in order, to move and to disappear from it, the direction of the movement of the data by the control circuit 21 may be any of the left, right, up and down directions. Also, the direction may be an oblique direction. When each data is displayed while moving, the control circuit 21 may display the data to move at a constant speed. The control unit 21 may display to stop the movement once when the data for one mail or one item reaches the center of the external display 11 and to start the movement again. Moreover, the control unit 21 may display to move while characters and so on blink until the data for one mail or one item moves to the center of the external display 11, to stop the blink and the movement at the center once, and to move again while blinking.

Also, when the data is scrolled and displayed on the external display 11, the direction of the scroll may be any of the upper, lower direction, left and right directions. Also, the direction may be an oblique direction.

In the above-mentioned example, a case is shown in which a key is arranged as the supplemental operation section 9 on the side of the mobile communication terminal 1 to input an instruction about the display on the external display 11. However, the key may be provided for the back of the first housing 3 or second housing 4 of the mobile communication terminal 1 (the external surface in the closed state). In this case, the operations at the steps S8, S10, S14, and S16 and the operation to scroll the display of data on the external display 11 and so on are carried out using the key provided for the back. Then, the control circuit 21 carries out the display, deletion and scroll of the data on the external display 11 in accordance with an instruction supplied from the key provided for the back.

The data to which the control circuit 21 carries out the display control on the external display 11 is not limited to the data of the arrived call and the data of the received e-mail. The whole data may be displayed, as mentioned above, even if it is when the other data is displayed on the external display 11.

What is claimed is:

1. A folded type mobile communication terminal apparatus comprising:
a receiving section which receives a call or an e-mail from a counter end;
a main display unit provided on an inner surface exposed when said mobile communication terminal is in an opened state;
an external display unit provided on an outer surface exposed when said mobile communication terminal is in a closed state;
a driver section which drives said main display unit and said external display unit;
a control circuit which controls said driver section such that data relating to the reception of said call or said e-mail and data of said received call or e-mail are displayed on said main display unit in said opened state of said mobile communication terminal and on said external display unit in said closed state of said mobile communication terminal,
wherein said control circuit controls said driver section such that a symbol indicative of the reception of said call is displayed on said main display unit in said opened state of said mobile communication terminal and on said external display unit in said closed state of said mobile communication terminal in place of said data relating to the reception of said call, when a predetermined time period passes away without a reply to said received call by a user after the display of said data relating to the reception of said call or said e-mail is started.

2. The folded type mobile communication terminal according to claim 1, wherein said control circuit automatically controls said driver section such that said data relating to the reception of said call or said e-mail is displayed on said main display unit in said opened state of said mobile communication terminal and on said external display unit in said closed state of said mobile communication terminal, in response to the reception of said call or said e-mail.

3. The folded type mobile communication terminal according to claims 1, wherein said predetermined time period is variable and can be set by the user.

4. The folded type mobile communication terminal according to claim 1, further comprising a memory, and
wherein said control circuit stores said data of said received call which is not replied by a user in said memory as non-replied call data.

5. The folded type mobile communication terminal according to claim 4, further comprising an outer key section provided on the outer surface of said mobile communication terminal in said closed state, and
wherein said control circuit reads out said non-reply call data from said memory in response to a non-replied call data display instruction inputted from said outer key section, and controls said driver section such that said read-out non-reply call data are displayed on said main display unit in said opened state of said mobile communication terminal and on said external display unit in said closed state of said mobile communication terminal.

6. The folded type mobile communication terminal according to claim 5, wherein said control circuit controls said driver section such that said read-out non-reply call data are scrolled and displayed on said main display unit in said opened state of said mobile communication terminal and on said external display unit in said dosed state of said mobile communication terminal, in response to a scroll instruction inputted from said outer key section.

7. The folded type mobile communication terminal according to claim 5, wherein said control circuit controls said driver section such that said read-out non-reply call data are displayed one by one on said main display unit in said opened state of said mobile communication terminal and on said external display unit in said closed state of said mobile communication terminal, in response to a display switch instruction inputted from said outer key section.

8. The folded type mobile communication terminal according to claim 1, further comprising an outer key section provided on the outer surface of said mobile communication terminal in said closed state, and
wherein said control circuit controls said driver section in response to an e-mail display instruction inputted from said outer key section, such that said data of said e-mail is displayed on said main display unit in said opened state of said mobile communication terminal and on said external display unit in said closed state of said mobile communication terminal.

9. The folded type mobile communication terminal according to claim 1, wherein said data of said received call includes at least one of a phone number of said counter end, a name of said counter end, and a reception date and time of said received call.

10. The folded type mobile communication terminal according to claim 9, further comprising a memory which stores sets of a name and said counter end, and
wherein said control circuit extracts said name from said memory based on said phone number contained in said received call and drives said driver section such that said extracted name is displayed.

11. The folded type mobile communication terminal according to claim 1, wherein said data of said received e-mail includes at least one of a mail address of a transmitter of said received e-mail, a name of said transmitter, a reception date and time of said received call, a title of said received e-mail, and main sentences of said received e-mail.

12. The folded type mobile communication terminal according to claim 11, further comprising a memory which stores sets of a name and mail address of said transmitter, and
wherein said control circuit extracts said name from said memory based on said mail address contained in said received e-mail and drives said driver section such that said extracted name is displayed.

13. The folded type mobile communication terminal according to claim 1, further comprising:
a state detecting unit which detects whether said mobile communication terminal is in said opened state or in said closed state, and generates an opened state detection signal when said mobile communication terminal is in said opened state and a closed state detection signal when said mobile communication terminal is in said closed state, and
wherein said control circuit drives said driver section such that a display operation is carried out by said main display unit based on said opened state detection signal, and by said external display unit based on said closed state detection signal.

14. The folded type mobile communication terminal according to claim 13, wherein said drive section comprises:
a first driver for said main display unit; and
a second driver for said external display unit, and wherein said control circuit drives said first driver based on said opened state detection signal and said second driver based on said closed state detection signal.

15. The folded type mobile communication terminal according to claim 13, wherein said drive section comprises:
a driver for said main display unit and said external display unit;
a first switch provided between said driver and said main display unit to connect said driver to said main display unit based on said opened state detection signal; and
a second switch provided between said driver and said external display unit to connect said driver to said external display unit based on said closed state detection signal, and
said control circuit carries out the display control to said driver.

16. The folded type mobile communication terminal according to claim 15, wherein the number of digits displayed on said main display unit is same as the number of digits displayed on said external display unit.

17. The folded type mobile communication terminal according to claim 1, further comprising an outer key section provided on the outer surface of said mobile communication terminal in said closed state, and
wherein said control circuit controls said driver section such that a symbol indicative of the reception of said call is displayed on said main display unit in said opened state of said mobile communication terminal and on said external display unit in said closed state of said mobile communication terminal in place of said data relating to the reception of said call, when a predetermined time period passes away without an input by a user via the outer key section in said closed state of said mobile communication terminal after the display of said data relating to the reception of said call or said e-mail is started.

18. A method of using a folded type mobile communication terminal apparatus, comprising the steps of:

(a) receiving a call or an e-mail from a counter end;

(b) detecting whether said mobile communication terminal is in an opened state or in a closed state; and (c) carrying out a display control such that data relating to the reception of said call or said e-mail and data of said received call or e-mail are displayed on a main display unit based on said opened state detection signal and on a external display unit based on said closed state detection signal, and wherein said main display unit is provided on an inner surface exposed when said mobile communication terminal is in said opened state, and said external display unit is provided on an outer surface exposed when said mobile communication terminal is in said closed state, wherein said (c) carrying out step comprises the step of:

carrying out the display control such that a symbol indicative of the reception of said call or said e-mail is displayed on said main display unit displays in said opened state of said mobile communication terminal and on said external display unit in said closed state of said mobile communication terminal in place of said data relating to the reception of said call, when a predetermined time period passes away without a reply to said received call by a user after the display of said data relating to the reception of said call or said e-mail is started.

19. The method according to claim 18, wherein said (c) carrying out step comprises the steps of:

determining whether said mobile communication terminal is in said closed state or in said opened state, based on the detecting result of said (b) detecting step;

driving a first driver for said main display unit when said mobile communication terminal is in said opened state; and driving a second driver for said external display unit when said mobile communication terminal is in said closed state.

20. The method according to claim 18, wherein said (c) carrying out step comprises the steps of:

driving a driver for said main display unit and said external display unit for the display control;

connecting said driver to said main display unit when said mobile communication terminal is in said opened state; and connecting said driver to said external display unit when said mobile communication terminal is in said closed state.

21. The method according to claim 18, wherein said (C) carrying out step comprises the steps of:

storing said data of said received call which is not replied by a user in a memory as non-replied call data;

reading out said non-reply call data from said memory in response to a non-replied call data display instruction inputted from an outer key section provided said outer surface of said mobile communication terminal in said closed state; and carrying out the display control such that said read-out non-reply call data are displayed on said main display unit in said opened state of said mobile communication terminal and on said external display unit in said closed state of said mobile communication terminal.

22. The method according to claim 21, wherein said (c) carrying out step comprises the step of:

carrying out the display control such that said read-out non-reply call data are scrolled and displayed on said main display unit in said opened state of said mobile communication terminal and on said external display unit in said closed state of said mobile communication terminal, in response to a scroll instruction inputted from said outer key section.

23. The method according to claim 21, wherein said (c) carrying out step comprises the step of:

carrying out the display control such that said read-out non-reply call data are displayed one by one on said main display unit in said opened state of said mobile communication terminal and on said external display unit in said closed state of said mobile communication terminal, in response to a display switch instruction inputted from said outer key section.

24. The method according to claim 18, wherein said (c) carrying out step comprises the step of:

carrying out the display control in response to an e-mail display instruction such that said data of said e-mail is displayed on said main display unit in said opened state of said mobile communication terminal and on said external display unit in said closed state of said mobile communication terminal.

25. The method according to claim 18, wherein said data of said received call includes at least one of a phone number of said counter end, a name of said counter end, and a reception date and time of said received call.

26. The method according to claim 18, wherein said data of said received e-mail includes at least one of a mail address of a transmitter of said received e-mail, a name of said transmitter, a reception date and time of said received call, a title of said received e-mail, and main sentences of said received e-mail.

27. The method according to claim 18, wherein said mobile communication terminal apparatus comprises an outer key section provided on the outer surface of said mobile communication terminal in said closed state, and wherein said c) carrying out step performs control such that a symbol indicative of the reception of said call is displayed on said main display unit in said opened state of said mobile communication terminal and on said external display unit in said closed state of said mobile communication terminal in place of said data relating to the reception of said call, when a predetermined time period passes away without an input by a user via the outer key section in said closed state of said mobile communication terminal after the display of said data relating to the reception of said call or said e-mail is started.

* * * * *